United States Patent
Musick et al.

(10) Patent No.: US 7,208,126 B2
(45) Date of Patent: Apr. 24, 2007

(54) TITANIUM DIOXIDE NANOPOWDER MANUFACTURING PROCESS

(75) Inventors: Charles David Musick, Waverly, TN (US); Austin H. Reid, Jr., Wilmington, DE (US); Lu Zhang, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 259 days.

(21) Appl. No.: 10/804,277

(22) Filed: Mar. 19, 2004

(65) Prior Publication Data
US 2006/0251573 A1 Nov. 9, 2006

(51) Int. Cl.
*C01G 1/00* (2006.01)
*C01G 23/00* (2006.01)

(52) U.S. Cl. ............ 423/69; 423/84; 423/610; 423/611; 423/612; 423/613; 977/773; 977/775; 977/777; 977/811

(58) Field of Classification Search ........... 423/610, 423/611, 612, 613, 69, 84; 977/773, 775, 977/777, 811
See application file for complete search history.

(56) References Cited

U.S. PATENT DOCUMENTS

| | | | |
|---|---|---|---|
| 2,448,440 A | | 8/1948 | King |
| 2,488,439 A | * | 11/1949 | Schaumann ............ 423/613 |
| 2,559,638 A | * | 7/1951 | Krchma et al. .......... 106/437 |
| 2,833,627 A | * | 5/1958 | Krchma .................. 423/612 |
| 3,208,866 A | * | 9/1965 | Lewis et al. ............ 106/437 |
| 3,214,284 A | | 10/1965 | Wilson |
| 3,385,665 A | | 5/1968 | Peacock et al. |
| 3,505,091 A | * | 4/1970 | Santos .................... 106/437 |
| 3,639,100 A | | 2/1972 | Rick |
| 3,640,745 A | | 2/1972 | Darr et al. |
| 4,937,064 A | | 6/1990 | Gonzalez |
| 5,201,949 A | * | 4/1993 | Allen et al. ............. 106/436 |
| 5,204,083 A | | 4/1993 | Magyar et al. |
| 5,508,015 A | * | 4/1996 | Gonzalez et al. ....... 423/613 |
| 5,698,177 A | | 12/1997 | Pratsinis et al. |
| 5,861,132 A | | 1/1999 | Pratsinis et al. |
| 6,254,940 B1 | | 7/2001 | Pratsinis et al. |
| 6,387,347 B1 | | 5/2002 | Deberry et al. |
| 2001/0043904 A1 | | 11/2001 | Tanaka et al. |

FOREIGN PATENT DOCUMENTS

GB 1 056 293 1/1967

OTHER PUBLICATIONS

European Search Report, Jun. 28, 2005.

* cited by examiner

*Primary Examiner*—Timothy C. Vanoy

(57) ABSTRACT

Titanium dioxide nanopowder is produced by a process, comprising:
(a) reacting titanium tetrachloride and an oxygen containing gas in the vapor phase in a flame reactor, at a flame temperature of at least about 800° C. in the presence of (i) water vapor in an amount ranging from about 1000 to about 50,000 parts per million, based on the weight of titanium dioxide under production, (ii) a diluent gas in an amount greater than about 100 mole percent based on the titanium tetrachloride and oxygen containing gas and (iii) a nucleant consisting essentially of a cesium substance wherein the cesium substance is present in an amount ranging from about 10 to about 5000 parts per million, based on the weight of the titanium dioxide under production, the pressure of reaction being sufficient to form titanium dioxide nanopowder.

11 Claims, No Drawings

TITANIUM DIOXIDE NANOPOWDER MANUFACTURING PROCESS

BACKGROUND OF THE INVENTION

1. Field of the Invention

This invention relates to the manufacture of titanium dioxide nanopowder. More particularly, the invention relates to the manufacture of titanium dioxide nanopowder of controlled particle size in a gas phase flame reactor by using a cesium substance.

2. Background of the Invention

The scientific and technological advantages of nanostructured particles and materials have been attracting considerable attention. The small size of nanoparticles (generally used to indicate particles less than 100 nm in diameter), which can be responsible for different useful properties (electronic, optical, electrical, magnetic, chemical, and mechanical), makes them suitable for a wide variety of industrial applications.

The manufacture of pigmentary titanium dioxide by oxidizing titanium tetrachloride in the gas phase in a flame reactor with an oxygen-containing gas is known. U.S. Pat. No. 5,201,949 describes the addition of cesium chloride for purposes of improving carbon black undertone, specific surface area and gloss properties.

Producing titanium dioxide nanopowder in a commercial scale flame reactor poses significant challenges. Identifying the appropriate operating conditions that can produce acceptable nanopowder product without causing reactor pluggage can be a significant a problem. Also operating conditions considered useful for producing titanium dioxide nanopowder can be difficult to carry out in a flame reactor due to aforementioned concerns with reactor pluggage and to related operating parameters that lead to the formation of particles and aggregates of particles of a size larger than that desired for typical nanoparticle applications. Deliberate control of a flame reactor in a manner that promotes the preferential generation of nanoparticulate materials is made difficult due to a propensity of impacts between particles at high pressures and mass loadings, leading to aggregate formation and particle growth. This can also lead to excessive wall deposition, resulting in the constriction of flow and ultimately to downstream pluggage of the reactor system.

SUMMARY OF THE INVENTION

In accordance with this invention there is provided a process for producing titanium dioxide nanopowder, comprising:

(a) reacting titanium tetrachloride and an oxygen containing gas in the vapor phase in a flame reactor, at a flame temperature of at least about 800° C. in the presence of (i) water vapor in an amount ranging from about 1000 to about 50,000 parts per million, based on the weight of titanium dioxide under production, (ii) a diluent gas in an amount greater than about 100 mole percent based on the titanium tetrachloride and oxygen containing gas and (iii) a nucleant consisting essentially of a cesium substance wherein the cesium substance is present in an amount ranging from about 10 to about 5000 parts per million, based on the weight of the titanium dioxide under production, the pressure of reaction being sufficient to form titanium dioxide nanopowder, and (b) recovering the titanium dioxide nanopowder having a surface area in the range of about 30 to about 300 $m^2/g$ and wherein about 50 volume percent of the particles have diameter of about 80 nm or less and wherein about 90 volume percent of the particles have a diameter of about 100 nm or less.

This invention can provide a method of making titanium dioxide nanopowder having a controlled particle size as determined by a particle size diameter measurement wherein about 10 volume percent of the particles can have diameter of about 30 nm or less, specifically about 25 nm or less, more specifically about 10 nm or less. Further, about 50 volume percent of the particles can have a particle size diameter of about 80 nm or less, specifically about 75 nm or less, more specifically about 50 nm or less. Still further, about 90 volume percent of the particles can have a particle size diameter of about 100 nm or less, specifically about 80 nm or less, more specifically about 75 nm or less. The particle size diameter measurements are for the aggregate particles, not for the primary particles.

The surface area of the particles can be in the range of about 30 to about 300 $m^2/g$, specifically about 50 to about 200 $m^2$/gram, more specifically about 75 to about 150 $m^2/g$.

It is contemplated that the process of this invention can permit higher nanopowder $TiO_2$ output while still maintaining the controlled particle size. The materials should show strong absorbance of ultraviolet radiation in the range of 400 nm and below, while demonstrating very low scattering in the visible wavelengths of 400 to 800 nm.

Typically, the carbon black undertone of the titanium dioxide nanopowder of this invention will be above about 30, specifically above about 40.

DETAILED DESCRIPTION OF THE INVENTION

The titanium tetrachloride and the oxygen containing gas are reacted in the presence of a cesium substance, typically a nucleant consisting essentially of a cesium substance. One function of the cesium substance is to control the particle size. It was found that the cesium substance can control the particle sizes ranges achieved in the production of titanium dioxide nanopowder in a flame reactor. The nucleant typically consists essentially of a cesium substance. By nucleant it is meant any substance which can aid in the formation of a nanopowder. By consisting essentially of it is meant that a nucleant other than a cesium substance can be present, provided that it is selected and is present in such an amount that it does not negate or nullify the benefits of the cesium substance such as particle size control. By cesium substance it is meant any form of cesium or a mixture of various forms of cesium which can provide titanium dioxide nanopowder including cesium metal, cesium salt, cesium oxide and other compounds containing cesium. Any compound of cesium with a vapor pressure suitable for the reaction conditions or that is soluble in water can be considered. Halides, salts of organic acids, including without limit carboxylic acids, and salts containing polyoxoanions such as phosphate or sulfate could be used.

If a cesium substance is used with a nucleant other than a cesium substance, then such nucleant typically will not be present in an amount in excess of that specified hereinafter for the cesium substance. Preferably, such nucleant will be present in an amount less than that of the cesium substance.

Examples of cesium substances include cesium oxide, cesium halides (chlorides, iodides, bromides, fluorides), nitrates, phosphates, carbonates, sulfates, acetates, alcoholates, benzoates, hydroxides and oxides. Typically cesium salts or water solutions of cesium salts such as cesium iodide, cesium chloride or cesium carbonate can be used.

Anions of the salt can be used. Also, the cesium substance can be substantially volatile at the reaction temperatures utilized for the production of the titanium dioxide nanopowder.

Any convenient procedure for adding the nucleant of this invention can be used and will be apparent to those skilled in the flame reactor art. Typical procedures are described in U.S. Pat. Nos. 3,208,866 and 5,201,949. The nucleant can be added to or incorporated in the reactant oxygen gas stream being charged to the reactor either as a finely divided solid, as a water solution, as a nonaqueous solution, as a molten salt, or as a colloidal dispersion. If desired, the nucleants can be charged directly into the reaction zone or to the mixed or mixing reactants just ahead of the actual flame of the reaction.

The water solutions of the soluble salts of the nucleants of this invention can provide a means for controlling product properties and compensating for variations in other process conditions. For example the amount of a given salt solution used can be varied to hold the carbon black undertone value constant. To provide more accurate control without varying the amount of water vapor used, two salt solutions of different concentrations can be provided and blended as desired at constant water consumption. These solutions are usually made up with pure agents. However, the presence of other substances which are not deleterious can be tolerated. Mixtures of salts can also be effective. Naturally occurring solutions and brines which contain the nucleants and which are free of discoloring ions may be used if clear or clarified of silt and other debris.

The amount of the cesium substance present can be in the range of about 10 to about 5000 parts per million, based on the weight of the titanium dioxide under production. The cesium will more specifically be present in an amount ranging from about 50 to about 1000 parts per million. The amount of the cesium substance is based on the weight of the cesium or other cesium component of the cesium salt, cesium oxide or cesium compound used. The amount of cesium substance can be increased for smaller particles with a greater surface area. When producing nanopowder, the greater number of higher surface area particles in the reactor can require large quantities of the cesium substance; that is, greater than about 200 ppm. While a quantity of cesium substance in the production of pigment size particles exceeding about 200 ppm can have a detrimental impact on CBU, it is believed that large quantities of cesium substance may not have the detrimental impact on CBU when making nanopowders.

A third gas hereinafter referred to as a diluent can be used in the process of this invention. The diluent gas may be introduced into the reactor by any convenient method; such methods will be apparent to those skilled in the flame reactor art. The diluent gas can be added together with the titanium tetrachloride. This diluent gas is considered to facilitate the production of small particle sizes by inhibiting particle agglomerations. The diluent gas may also be useful for preventing deposition of solids within the reactor. The diluent gas can also be used as a carrier for the nucleant. A solution of the nucleant can be sprayed into the gas stream and conveyed into the reactor as a mist. Also they may be conveyed as a fine solid or smoke. The diluent gas can be inert and should not react with the reactants or the reaction product under the conditions under which the reaction product is produced. Examples of suitable diluent gases include chlorine, nitrogen, carbon dioxide, noble gases (e.g. helium, neon or argon), and recycle gas, i.e., gas withdrawn from the reactor outlet from which the titanium dioxide is removed. Typically the recycle gas contains chlorine, carbon dioxide nitrogen and/or oxygen. The amount of the diluent gas can range from greater than about 100 mole percent based on the titanium tetrachloride and oxygen reactants, specifically about 100 to about 500. The typical mole ratio of diluent to $TiO_2$ is 1.5:1. However, the amount of diluent can vary depending upon the flue diameter and the operating pressure. Suitable methods for introducing the diluent would be apparent to those skilled in the flame reactor art, including the method described in U.S. Pat. No. 5,508,015.

An amount of aluminum trichloride suitable to provide the rutile crystalline form of the titanium dioxide can be used. Without aluminum trichloride a product containing a predominant amount of the anatase crystalline form can be manufactured. The aluminum trichloride can be in the vapor form in an amount ranging from about 0.1 to about 10 percent based on the weight of the titanium tetrachloride. A procedure for incorporating aluminum trichloride is described in U.S. Pat. No. 3,505,091.

The pressure for carrying out the reaction can range from about 66.88 to about 273.72 kPa (about 9.7 to about 39.7 psia), specifically about 101.35 to about 239.25 kPa (about 14.7 to about 34.7 psig).

The residence time of the reactants in the mixing zone of the reactor can range from about 5 to about 40 milliseconds, specifically about 10 to about 35 milliseconds.

Mean residence time (RT) is basically a function of the volume of the reactor (V) and the volumetric flow rate of the reactants and may be calculated using the following equation:

$$RT=3D/V$$

Wherein RT is the residence time of the reactants in the mixing zone of the reactor in seconds, D is the diameter of the reactor's mixing zone in feet measured at about the location where the reactants are first brought together, and V is the velocity of the reactants in feet per second.

The flame temperature can be at least about 800° C., specifically from about 800° to about 1800° C., more specifically from about 1200° C. to about 1800° C. even more specifically from about 1300 to about 1600° C.

The water vapor can be present in an amount of about 1000 to about 50,000 parts per million, based on the weight of the titanium dioxide under production, specifically about 10,000 to about 20,000, based on the weight of the titanium dioxide under production. Any water utilized as a solvent for the nucleant is considered in the total amount of water added. Any hydrogen-containing organic compound used as a liquid medium, such as benzene, or methane burns to form water and also acts as the water of nucleation.

The carbon black undertones ("CBU") values mentioned herein are described in U.S. Pat. No. 2,488,440 using a rating or value of 10 rather than 100. A CBU value for titanium dioxide nanopowder will be above about 30, specifically above about 40.

It is contemplated that the cesium substance of this invention will have many advantages in the production of titanium dioxide nanopowder. The addition of metal salts of Cs can increase the number concentration of particles produced in the flame and decrease the particle size.

It is contemplated that the process of this invention is capable of increasing titanium dioxide nanopowder output while still maintaining the targeted or desired level of CBU. For example, to maximize output, a chloride process titanium dioxide plant suitable for producing pigment-size titanium dioxide (typically greater than 100 nm in diameter), is typically operated with the use of KCl, and the output is increased until the CBU falls to the desired level. (note that there usually is an inverse relationship between titanium dioxide output and CBU, at least for pigment-size product.) At such point, output is maximized, and additional increases in output generally are not possible unless CBU is decreased or expensive new equipment is installed. However, at such point, it is contemplated that use of the cesium substance of this invention can permit increased nanopowder product output while still maintaining the desired level of CBU. That is, if the cesium substance of this invention were added at such point, the CBU would increase and the output could then be increased until the CBU decreased to the desired level. It should be noted that such increase in output is highly commercially significant because (1) it is obtained without expensive capital investment, or equipment installations or modifications, and (2) modern chlorine process titanium dioxide plants operate at high rates (i.e. five or more tons per hour) in production of pigment-size titanium dioxide which rates would be beneficial for the production of nanopowder and thus even minor percentage increases in output can result in substantially increased pounds of output.

In a manner similar to that described in the immediately preceding paragraph, it is believed that the process of this invention can increase nanopowder titanium dioxide output while still maintaining the target or desired level of gloss. Also while certain process conditions can increase titanium dioxide gloss, they generally decrease CBU. Under such process conditions, the use of this invention is believed to be beneficial to increase CBU.

It is believed that the process of this invention can also extend the times between maintenance shutdowns and/or provide operating flexibility for chloride titanium dioxide plants. For example, operation for extended periods of time can increase buildup of reactants, products and by-products in the process equipment which can increase operating pressure. Also, desired reaction conditions may sometimes require or cause increased pressure. The increased pressure can be a problem by causing an adverse impact on titanium dioxide CBU, surface area and gloss which can require (1) the output to be decreased to restore such properties, or (2) a plant shutdown to remedy the causes of the pressure increase. It is believed that under such conditions of increased pressure, use of the cesium substance of this invention could remedy some or all of such problems and thereby extend the times between maintenance shutdowns and/or provide for greater operating flexibility.

It is contemplated that the flame reactor of this invention will comprise a means for increasing heat transfer. Suitable means include without limitation finned flue equipment of the kind described in U.S. Pat. No. 4,937,064. The use of flue piping containing internal fins, as disclosed in the aforementioned patent, provides a means of increasing effective heat transfer without substantially changing the fundamental geometry of the reaction system. Since heat removal and the control of same is important for manufacture of particulate materials of controlled and commercially-valuable size distribution, the finned flue equipment can provide increased production rates and product performance from the flame reactor system.

Fuel for the flame reactor can be any combustible gas such as carbon monoxide, benzene, naphthalene, acetylene, anthracene and/or methane.

In one embodiment, the invention herein can be construed as excluding any element or process step that does not materially affect the basic and novel characteristics of the composition or process. Additionally, the invention can be construed as excluding any element or process step not specified herein.

The following examples illustrate the invention.

EXAMPLES

Test Procedures Used in Examples Surface Area

The specific surface area of a sample made according to the Examples is defined as the surface area of one gram of particles. It is defined by the formula:

$$S = \frac{6}{(Dia)(Den)}$$

wherein

S is the specific surface area in square meters per gram,

Dia is the average particle diameter in meters; and

Den is the density of the pigment in grams per cubic meters.

The surface area can be determined by gas absorption or by determining the average particle size by use of an electron microscope and then using such particle size to calculate the surface area by use of the above formula. Additional information regarding determining the specific surface area is set forth in T.P. Patton Paint Flow and Pigment Dispersion, 1979, John Wiley and Son, Inc.

UPA Particle Size Distribution

The particle size distribution of the particles formed in the Examples, and shown in Table 1, were measured using the ultrafine particle analyzer dynamic light scattering technique. The MICROTRAC ULTRAFINE PARTICLE ANALYZER (UPA) (a trademark of Leeds and Northrup, North Wales, Pa.) uses the principle of dynamic light scattering to measure the particle size distribution of particles in liquid suspension. The measured size range is 0.003 µm to 6 µm (3 nm to 6000 nm). The dry particle sample needs to be prepared into a liquid dispersion to carry out the measurement. An example procedure is as follow:

(1) Weigh out 0.08 g dry powder.

(2) Add 79.92 g 0.1% tetrasodium pyrophosphate (TSPP) solution in water to make a 0.1 wt. % suspension.

As described in the following Examples, the gas phase process and operating conditions of the present invention employed in a laboratory scale flame reactor operating at a rate of 0.04 g/min of TiO2 in which the titanium dioxide nanopowder is produced is considered to provide design data for large scale production.

EXAMPLES

Example 1

A coflow-diffusion burner was used for aerosol synthesis of titania nanoparticles. The reactor consists of three concentric tubes with inner diameters of 3/16 in (4.76 mm), 3/8 in (9.52 mm) and 9/16 in (14.29 mm) and a wall thickness of 0.035 in (0.889 mm). TiCl$_4$ vapor was thoroughly premixed with O$_2$ by bubbling O$_2$ at a rate of 1 l/min through a cylinder maintained at room temperature that contains liquid TiCl$_4$. This TiCl$_4$ containing O$_2$ stream was introduced through the center tube. Methane flew through the inner annulus at a rate of 0.5 l/min. Oxygen was introduced as a carrier gas to a Baxter Healthcare atomizer (Airlife™ Misty-Neb™ Nebulizer, Cat. 002033) at a rate of 3 l/min. The atomizer contained CsCl aqueous solution (0.5% by weight). This oxygen stream carrying CsCl solution droplets was introduced into the reactor through the second annular. This resulted in a simple diffusion flame. The flame temperature was about 1500° C., measured one cm away from the surface of the concentric tubes. The reaction was carried out under atmospheric pressure. All gases were delivered from cylinders with the flow rates controlled by mass flow controllers. $TiO_2$ particles were formed in the flame as the product of $TiCl_4$ oxidation and samples were collected on a sintered metal filter. The particle size distribution and surface area of the particles was measured and reported in Table 1.

Example 2

The same procedure as Example 1 was followed. The particle size distribution was measured and reported in Table 1.

Comparative Example A

In this Example, CsCl was not used.

The coflow-diffusion burner and operating conditions described in Example 1 was used. $TiCl_4$ vapor was thoroughly premixed with $O_2$ by bubbling $O_2$ at a rate of 1 l/min through a cylinder maintained at room temperature that contained liquid $TiCl_4$. This TiCl4 containing $O_2$ stream was introduced through the center tube. Methane flew through the inner annulus at a rate of 0.5 l/min. Additional oxygen was provided through the outer annulus at 3 l/min. This resulted in a simple diffusion flame. All gases were delivered from cylinders with the flow rates controlled by mass flow controllers. $TiO_2$ particles were formed in the flame as the product of $TiCl_4$ oxidation and samples were collected on a sintered metal filter. The particle size distribution and surface area were measured and reported in Table 1.

Comparative Example B

The procedure of Example 1 was followed except CsCl was not used.

$TiCl_4$ vapor was thoroughly premixed with $O_2$ by bubbling $O_2$ at a rate of 1 l/min through a cylinder maintained at room temperature that contained liquid $TiCl_4$. This $TiCl_4$ containing $O_2$ stream was introduced through the center tube. Methane flew through the inner annulus at a rate of 0.5 l/min. Oxygen was introduced as a carrier gas to a Baxter Healthcare atomizer (Airlife™ Misty-Neb™ Nebulizer, Cat. 002033) at a rate of 3 l/min. Deionized water was the liquid being atomized. This oxygen stream carrying water droplets was introduced into the reactor through the second annulus. This resulted in a simple diffusion flame. All gases were delivered from cylinders with the flow rates controlled by mass flow controllers. $TiO_2$ particles were formed in the flame as the product of $TiCl_4$ oxidation and samples were collected on a sintered metal filter. The particle size distribution and surface area were measured and reported in Table 1.

TABLE 1

| | Example 1 | Example 2 | Comparative Example A | Comparative Example B |
|---|---|---|---|---|
| d10 (nm) | 45.8 | 44.7 | 92.7 | 74.7 |
| d50 (nm) | 72.4 | 78.1 | 166.5 | 154.3 |
| d90 (nm) | 111.2 | 129.8 | 284.5 | 253.1 |
| Surface Area | 61.69 | not meas. | 27.73 | 75.5 |

Particles made in accordance with Examples 1 and 2 in which CsCl was added to the flame reactor had a significantly smaller size as illustrated by the particle size distribution data reported in Table 1. The particles made following the procedure of Example 1 also had a large surface area which is typical of small particles. The measured surface area for the particles of Comparative Example B was higher than expected for large particles but is considered to have resulted from a high degree of agglomeration.

The description of illustrative and preferred embodiments of the present invention is not intended to limit the scope of the invention. Various modifications, alternative constructions and equivalents may be employed without departing from the true spirit and scope of the appended claims.

What is claimed is:

1. A process for producing titanium dioxide nanopowder, comprising:

(a) reacting titanium tetrachloride and an oxygen containing gas in the vapor phase in a flame reactor, at a flame temperature of at least about 800° C. in the presence of (i) water vapor in an amount ranging from about 1000 to about 50,000 parts per million, based on the weight of titanium dioxide under production, (ii) a diluent gas in an amount greater than about 100 mole percent based on the titanium tetrachloride and oxygen containing gas and (iii) a nucleant consisting essentially of a cesium substance wherein the cesium substance is present in an amount ranging from about 10 to about 5000 parts per million, based on the weight of the titanium dioxide under production, the pressure of reaction being sufficient to form titanium dioxide nanopowder, and (b) recovering the titanium dioxide nanopowder having a surface area in the range of about 30 to about 300 $m^2/g$ and wherein about 50 volume percent of the particles have a diameter of about 80 nm or less and wherein about 90 volume percent of the particles have a diameter of about 100 nm or less.

2. The process of claim 1 in which the cesium substance is present in an amount ranging from about 50 to about 1000 parts per million.

3. The process of claim 1 in which the temperature is in the range of about 800 to about 1800° C.

4. The process of claim 1 in which the titanium tetrachloride and the oxygen containing gas are reacted in a reaction zone in which the titanium tetrachloride and the diluent are introduced into the reaction zone in a mixture.

5. The process of claim 1 in which the diluent is recycle gas.

6. The process of claim 1 in which the flame reactor further comprises a means for increasing heat transfer.

7. The process of claim 1 in which the cesium substance is a cesium halide or salt of an organic acid.

8. The process of claim 1 in which the residence time for reacting the titanium tetrachloride and the oxygen containing gas ranges from about 5 to about 40 milliseconds.

9. The process of claim 1 in which the titanium dioxide is predominantly in the anatase crystalline form.

10. The process of claim 1 in which the pressure of reaction ranges from about 0 to about 172 kPa.

11. The process of claim 1 in which the pressure of reaction ranges from about 0 to about 138 kPa.

* * * * *